US012614233B1

(12) United States Patent
Aghamohamadnia et al.

(10) Patent No.: US 12,614,233 B1
(45) Date of Patent: Apr. 28, 2026

(54) GEOSPATIAL DATA PROCESSING AND ALERTING PLATFORM FOR FINANCIAL RISK MONITORING

(71) Applicant: Morgan Stanley Services Group Inc., New York, NY (US)

(72) Inventors: Milad Aghamohamadnia, Brooklyn, NY (US); Brianne K. Hendrickson-Smith, Brooklyn, NY (US); Nicolette M. Robinson, Derby (GB); Sheng C. Tzou, Westport, CT (US); Alexandra Berenyi, Budapest (HU); Andrew K. Ford, Cranford, NJ (US)

(73) Assignee: Morgan Stanley Services Group Inc., New York, NY (US)

( * ) Notice: Subject to any disclaimer, the term of this patent is extended or adjusted under 35 U.S.C. 154(b) by 0 days.

(21) Appl. No.: 19/326,328

(22) Filed: Sep. 11, 2025

(51) Int. Cl.
*G06Q 40/06* (2012.01)
*G06F 16/29* (2019.01)

(52) U.S. Cl.
CPC ........... *G06Q 40/062* (2025.08); *G06F 16/29* (2019.01); *G06Q 40/064* (2025.08)

(58) Field of Classification Search
CPC ..... G06Q 40/062; G06Q 40/064; G06F 16/29
USPC ...................................................... 705/3–44
See application file for complete search history.

(56) References Cited

U.S. PATENT DOCUMENTS

| | | | |
|---|---|---|---|
| 11,106,796 | B2 | 8/2021 | Limonciello et al. |
| 12,250,201 | B1 * | 3/2025 | Rosenoer ................ H04L 41/16 |
| 12,293,414 | B1 * | 5/2025 | VanNess ................ G06Q 40/06 |

(Continued)

OTHER PUBLICATIONS

Balakrishan N. et al., "Predictive Modeling of Landslide using Machine Learning", Proceedings of the 8th International Conference on Trends in Electronics and Informatics (ICOEI-2025) IEEE Xplore Part No. CFP25J32-ART; ISBN: 979-8-3315-4460-7 (Year: 2025).*

(Continued)

*Primary Examiner* — Frantzy Poinvil
(74) *Attorney, Agent, or Firm* — K&L Gates LLP

(57) ABSTRACT

Computer-implemented systems and methods monitor financial risk monitoring using geospatial data. The system includes a data ingestion pipeline that processes heterogeneous geospatial data, normalizes the data into a common spatial reference framework, and applies hierarchical spatial indexing. The indexed data is stored in a geospatial database configured to maintain metadata and alert rules. A financial system stores information linking financial instruments and portfolios to geospatial regions. An application programming interface (API) layer enables spatial querying, rule-based alert evaluation, and notification delivery. A user interface subsystem deployed on client devices facilitates interaction with the system through graphical dashboards, programmatic tools, or natural language inputs. The system supports real-time monitoring and automated alerting based on spatial triggers and financial exposure thresholds, enabling decision-making for risk-sensitive financial domains. The architecture supports high-throughput processing, flexible deployment, and integration with external financial systems and workflows.

23 Claims, 10 Drawing Sheets

(56) References Cited

U.S. PATENT DOCUMENTS

| | | | |
|---|---|---|---|
| 2011/0126111 A1* | 5/2011 | Gill | G06F 21/577 |
| | | | 715/736 |
| 2011/0153368 A1* | 6/2011 | Pierre | G06Q 10/067 |
| | | | 715/848 |
| 2014/0074762 A1* | 3/2014 | Campbell | G06Q 40/00 |
| | | | 706/46 |
| 2014/0244674 A1* | 8/2014 | Mollis | G06F 16/258 |
| | | | 707/756 |
| 2016/0203146 A1 | 7/2016 | Moll et al. | |
| 2018/0075327 A1* | 3/2018 | Rubinton | G06F 3/1292 |
| 2018/0165616 A1 | 6/2018 | Sun et al. | |
| 2018/0182041 A1 | 6/2018 | Sheridan et al. | |
| 2020/0134733 A1 | 4/2020 | Maddox et al. | |
| 2021/0035226 A1 | 2/2021 | Dybvik et al. | |
| 2023/0076243 A1 | 3/2023 | Watt et al. | |
| 2023/0143540 A1* | 5/2023 | Kenyon-Dean | G06F 3/04847 |
| | | | 715/771 |
| 2025/0328972 A1* | 10/2025 | Lent | G06N 3/08 |

OTHER PUBLICATIONS

Boutayeb et al., "When Machine Learning Meets Geospatial Data: A Comprehensive GeoAI Review", IEEE Journal of Selected Topics in Applied Earth Observations and Remote Sensing, vol. 18, (Year: 2025).*

* cited by examiner

Natural Language Interface Flow

FIG. 7

Wildfire Monitoring for Mortgage Portfolio

Supply Chain Risk - Typhoon Impact Analysis

FIG. 9

Biodiversity Risk Assessment

GEOSPATIAL DATA PROCESSING AND ALERTING PLATFORM FOR FINANCIAL RISK MONITORING

BACKGROUND

Geospatial data has become increasingly important in a variety of industries for monitoring and responding to physical world events. In domains such as weather forecasting, logistics, infrastructure planning, and environmental compliance, geographic information systems (GIS) are routinely used to ingest, analyze, and visualize spatial data. Traditional GIS platforms such as ArcGIS, QGIS, and CARTO support ingestion of structured vector and raster data, offer spatial querying capabilities, and may provide map-based interfaces for end users. Some systems also enable integration of third-party data layers or custom alerting mechanisms through scripting or APIs.

In the insurance industry, event-based exposure assessment tools and geospatial weather alert services are commonly used to monitor risks. These systems typically focus on specific domains such as property and casualty risk, weather prediction, or natural disaster monitoring. The functionality is often tailored to a predefined set of data types or use cases. In many implementations, geospatial data is processed in batch mode, with alerts generated manually or on fixed intervals, and with limited flexibility to define portfolio-specific rules or thresholds.

In financial services environments, integration of geospatial data presents additional technical and operational challenges. Regulatory restrictions may preclude the use of cloud-hosted services, requiring all data processing and storage to occur in on-premises infrastructure. Financial datasets-such as mortgage portfolios, commercial real estate holdings, or securities with physical-location attributes—are often maintained in tabular formats within relational databases. Mapping spatial data to these financial assets involves complex joins, spatial transformations, and consistent schema design. Existing GIS tools and alerting systems generally lack direct interoperability with financial data warehouses or risk management platforms, requiring extensive custom development for integration.

Furthermore, many conventional GIS solutions require specialized technical expertise to operate and maintain. The ingestion of raw geospatial data often involves manual steps, including reprojecting coordinate systems, converting file formats, or resolving schema mismatches. Spatial queries in these systems may rely on geometry-based computation, which can be computationally intensive and difficult to optimize for large-scale or near real-time analysis. Real-time event monitoring and alerting based on spatial triggers-particularly where the triggers must be evaluated across thousands of financial assets-remains difficult to implement using traditional systems.

In practice, the ingestion, normalization, and use of geospatial data often occur as isolated, application-specific pipelines, with limited reuse or standardization across use cases. This can lead to redundant processing, inconsistent data quality, and increased burden on downstream application developers. Moreover, support for natural language interfaces or automated report generation is typically limited or nonexistent, further restricting access to spatial insights for non-technical users such as portfolio managers, analysts, or compliance officers.

SUMMARY

In one general aspect, the present invention is directed to systems and methods for monitoring financial risk using geospatial data. Organizations with geographically distributed assets or exposures—such as mortgage portfolios, infrastructure investments, or supply chains—face growing pressure to identify and mitigate risks arising from environmental hazards, regulatory changes, and other location-dependent factors. The disclosed invention enables these organizations to integrate disparate geospatial and financial datasets into a unified, spatially-aware monitoring framework that can detect emerging threats and trigger actionable alerts in near real time.

In one embodiment, a computer-implemented system ingests geospatial data from heterogeneous sources, including satellite feeds, public hazard databases, and proprietary sensors, each of which may provide data in distinct formats and projections. The system normalizes this data into a common spatial reference framework and applies a hierarchical grid-based indexing scheme—such as quadtree or hex-based encodings—at multiple resolutions This hierarchical indexing enables efficient spatial alignment, querying, and analysis by allowing both coarse and fine-grained operations, improving scalability and performance when processing large or complex geospatial datasets. The normalized and indexed data is then stored in a geospatial database (i.e., a database system optimized for storing, indexing, and querying spatial data), which is implemented as a spatially indexed relational database system to enable efficient spatial queries and data management.

The system also includes a financial system (i.e., one or more data stores and applications that manage information identifying financial instruments and portfolios, as well as linkage data associating those financial instruments with specific geographic regions). An application programming interface (API) layer provides programmatic access to the geospatial database and the rules engine, which evaluates alert conditions based on both geospatial updates and financial exposure thresholds. When alert conditions are satisfied, a notification subsystem generates alert messages. A user interface subsystem, deployed on client computing devices and coupled to the geospatial database and rules engine, enables end users to interact with the system by submitting queries, reviewing alerts, and exploring risk exposure maps and reports.

In some implementations, the indexing scheme may use an H3 grid structure to provide hierarchical spatial resolution at various levels of granularity. The geospatial database may support complex spatial joins, range queries, and proximity-based retrieval. The financial system may incorporate portfolio analytics capabilities to compute aggregated exposure metrics, or a data integration module to enrich stored records with external market feeds. The rules engine may combine spatial hazard conditions with financial thresholds to detect compound risks. Notifications may be surfaced through graphical dashboards, SDK integrations, or natural language query interfaces. The data ingestion pipeline may support periodic re-ingestion of updated spatial data and parallel processing of spatial cells to enhance scalability and responsiveness.

Embodiments of the present invention provide several technical advantages. By transforming diverse geospatial inputs into a normalized, spatially indexed structure, the system supports efficient spatial analysis and alignment with financial datasets. The use of hierarchical indexing enables both coarse and fine-grained monitoring, while the API-based architecture facilitates modularity, integration with external systems, and automation. Additionally, by combining geospatial event detection with financial exposure modeling, the system enables scalable, real-time mitigation of spatially correlated risks across portfolios and regions. These and other technical benefits of the present invention will be apparent from the description that follows.

FIGURES

Various embodiments of the present invention are described herein by way of example in connection with the following figures.

FIGS. 7, 8 and 9 illustrate example use cases of the present invention, according to various embodiments of the present invention.

DESCRIPTION

The present invention relates, in various embodiments, to a modular platform for processing, indexing, and analyzing geospatial data for financial risk monitoring and alerting. The platform supports ingestion of heterogeneous spatial data formats, normalizes spatial representations into a common spatial indexing framework, links geospatial data to financial asset records, and enables automated alerting based on user-defined spatial conditions. The system architecture includes an extensible ETL pipeline, a dual-table spatial database schema, an API-based query and alerting layer, and user-facing interfaces for interaction, including natural language processing components. In various implementations, the platform may be deployed within a controlled computing environment (e.g., on-premises infrastructure) and configured to operate across diverse financial use cases, including asset-level monitoring, supply chain risk evaluation, and environmental compliance assessments. The system may be particularly beneficial to financial institutions, investment firms, commercial banks, insurance providers, and asset managers with geographically distributed portfolios or physical infrastructure whose value or performance may be affected by geospatial factors such as natural disasters, weather events, environmental risks, or jurisdictional changes. Government agencies, ESG analysts, or corporate compliance teams may also employ the system to monitor spatial risks associated with regulatory exposure, biodiversity impacts, or operational resilience.

Figure 1:
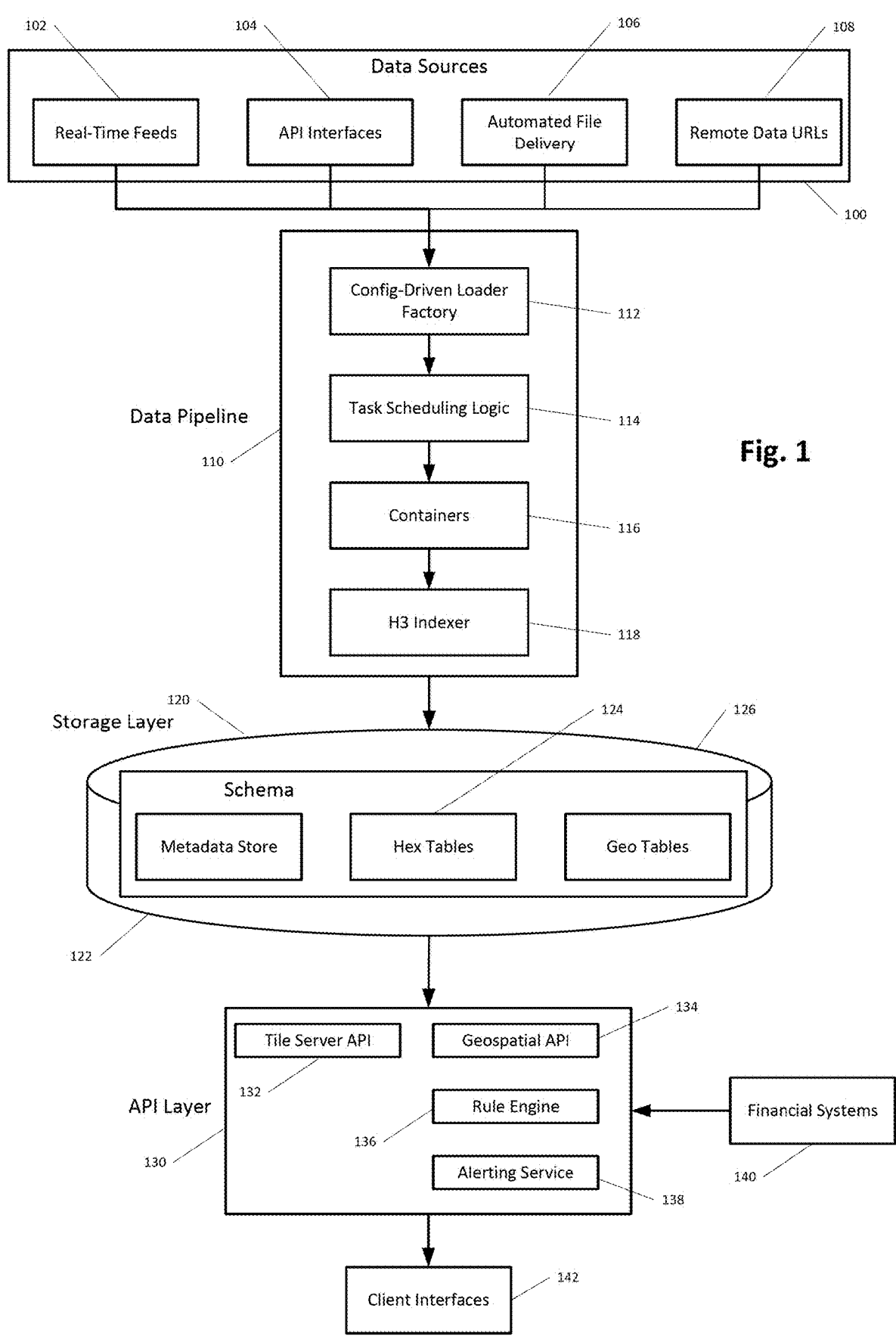
FIG. 1 is a diagram of an exemplary financial risk monitoring system using geospatial data, according to various embodiments of the present invention.

FIG. 1 illustrates an example system architecture for processing and alerting on geospatial data in connection with financial assets. The illustrated system comprises four principal layers: a data ingestion layer, a data processing pipeline, a structured storage layer, and an API and alerting layer. The architecture is preferably modular and may be deployed within secure, controlled computing environments, such as on-premises infrastructure operated by a financial institution. In some embodiments, various components may also be deployed in containerized or virtualized environments on cloud or hybrid platforms, subject to regulatory or organizational requirements.

At the top of the architecture, the system ingests spatial and tabular data from a range of external data sources (100). These sources may include real-time data feeds (102), such as wildfire perimeter updates, storm path forecasts, or satellite-based hazard monitoring systems. In some cases, external systems may provide access through API interfaces (104), returning data in structured or semi-structured formats such as GeoJSON, XML, or JSON-based schemas. Other sources may rely on automated file delivery (106), including regularly scheduled uploads to secure file transfer (SFTP) locations, or integrations with internal enterprise data delivery pipelines. Additionally, the system may ingest files or datasets from remote data URLs (108), such as downloadable links to shapefiles, NetCDF files, raster imagery, or other geospatial formats hosted by public or private data providers. Data formats may vary across sources and may include vector data (e.g., shapefiles, KML/KMZ, GeoJSON), raster data (e.g., GeoTIFF, HDF5, digital elevation models), hybrid geospatial archives (e.g., geoparquet, zipped tile bundles), or tabular datasets containing embedded geographic coordinates.

Once acquired, incoming data is processed by a data pipeline (110) composed of multiple modular stages. A configuration-driven loader factory (112) can interpret ingestion rules and data transformation parameters defined in structured configuration files, such as YAML or JSON documents. These configurations allow the pipeline to flexibly accommodate new data sources without requiring custom code for each source. Processing workflows are orchestrated through task scheduling logic (114), which may be implemented using a directed acyclic graph (DAG)-based orchestration engine or an equivalent task dependency scheduler. The DAG scheduler can coordinate parallelized execution of processing tasks across containerized environments (116), which may be implemented using containerization technologies. The containers encapsulate software dependencies for parsing, transforming, and validating geospatial data. After transformation, data are spatially normalized using an indexing module (118), which can apply a multi-resolution spatial indexing scheme such as H3 to convert irregular geometries into a uniform grid of hexagonal cells.

H3 is an open-source geospatial indexing system developed by Uber Technologies, Inc., which subdivides the surface of the Earth into a grid of hexagonal cells organized into multiple resolution levels. Each cell is assigned a unique identifier that encodes both its geographic location and its resolution, enabling efficient spatial indexing, querying, and aggregation.

Unlike traditional rectangular or quad-tree tiling systems, H3 uses hexagons as the base geometry, which reduces distortion across the globe and provides more uniform adjacency properties. At the coarsest resolution (resolution 0), the Earth is divided into 122 base cells. Each subsequent resolution subdivides each hexagon into finer hexagons, producing over 15 levels of detail (up to resolution 15), with average cell diameters ranging from thousands of kilometers down to less than one meter.

The use of H3 enables fast and scalable spatial joins, containment tests, and neighborhood traversals by transforming complex geometric operations into simple set operations over H3 cell identifiers. In the context of the present system, H3 indexing facilitates the conversion of arbitrary vector geometries (e.g., polygons, lines, points) into discrete, tileable representations that are resolution-consistent, compact, and highly performant for use in financial risk monitoring applications. This allows for rapid determination of whether an event (e.g., wildfire perimeter, flood zone, biodiversity habitat) intersects with locations of financial significance (e.g., properties, facilities, insured assets) and supports visualization across different zoom levels without the need for external rendering engines.

Still focusing on FIG. 1, normalized data can be stored in a structured schema within a persistent storage layer (120). The storage layer can be implemented using a relational database management system such as PostgreSQL, optionally extended with spatial processing capabilities via Post-GIS and custom extensions for H3 indexing. In some embodiments, the H3 indexing functionality may be provided by or based on open-source libraries licensed under the Apache License, Version 2.0. The schema can include a centralized metadata store (122), which can maintain dataset-level attributes, lineage information, and validation statuses. It can also include "hex tables" (124), which can contain the H3-indexed representations of ingested geospatial features, enabling fast and resolution-consistent spatial queries. In other embodiments, other geometry-based or shape-based tables may be used instead, corresponding to the particular type of spatial indexer implemented in the data pipeline (e.g., the indexer 118 in FIG. 1).

Complementing the hex (or other shape-based) tables (124) can be "geo tables" (126), which can store original geometric representations (e.g., polygons, multipolygons) along with associated attribute data. In many implementations, the geo tables hold spatial features corresponding to irregularly bounded real-world entities, such as townships, counties, census blocks, school districts, or ecological zones, for example. These geometries may be defined by jurisdictional, regulatory, or physical boundaries and are typically represented using standard geospatial formats, such as WKT or GeoJSON, with associated metadata and classification attributes.

The hex tables may be derived from these geo tables by applying the spatial indexer (e.g., H3 indexer 118), which "fills" or approximates the original irregular geometries using collections of uniformly shaped spatial cells-such as hexagons in the case of H3. In that sense, the hex tables 124 may use H3 indices. Each hex cell is associated with the original geometry from which it was generated, creating a mapping that supports resolution-consistent spatial queries across large datasets. For example, a single county polygon stored in the geo tables may map to dozens or hundreds of H3 cells stored in the hex tables, depending on the resolution level. This dual-table structure allows the system to retain both the original high-fidelity geometric data and a spatially indexed representation optimized for performant querying, visualization, and alert generation.

The system can expose its functionality through an API layer (130), which can support both data retrieval and event-based alerting. The API layer can include a tile server API (132), which can render and deliver spatial data as image tiles for visualization in client applications, and a separate geospatial query API (134), which can support spatial queries such as containment, intersection, and proximity evaluation. These APIs enable client applications to retrieve rendered map layers, perform spatial joins, or identify geographic cells and regions affected by incoming geospatial data. A rule engine (136) can support user-defined conditions for triggering alerts based on spatial relationships, predefined thresholds, or other rule-based logic. An alerting service (138) can monitor incoming or updated data and evaluate the registered rules either on a scheduled basis or upon data ingestion. When one or more alert conditions are satisfied, the alerting service can generate notifications through one or more channels, including email, dashboard updates, webhooks, or message queues.

In the illustrated example, the system is deployed within a financial services environment, where financial systems (140) may include multiple integrated subsystems or data repositories, such as a location database, a portfolio database, a security master, and a risk management system. Each of these components can interface with one or more elements of the API layer (130) to support spatially informed financial workflows. The location database can register and maintain geographic information for financial assets, such as the physical addresses or geocoded coordinates of properties, facilities, or infrastructure components. The portfolio database can store asset-level holdings and portfolio hierarchies, enabling the system to associate spatial events with specific positions or exposure tiers. The security master can provide authoritative identifiers, mappings, and classifications for securities and issuers, which may be linked to geospatial data via metadata schemas or reference tables. The risk management system can consume alerts generated by the alerting service (138), evaluate them in context of exposure thresholds or scenario models, and generate downstream actions or reports for compliance or operational response.

Although the example shown reflects a deployment by a financial institution-such as a commercial bank, investment firm, or asset manager—the system is not limited to financial applications. Other types of entities, such as government agencies, environmental compliance organizations, insurers, or corporate ESG teams, may use the same system architecture to track spatially relevant events in relation to assets, facilities, operations, or regulatory regions of interest. These organizations may integrate the system with internal databases or tools functionally analogous to those shown in the figure, such as infrastructure registries, compliance trackers, supplier location databases, or operational risk systems.

Figure 1A:
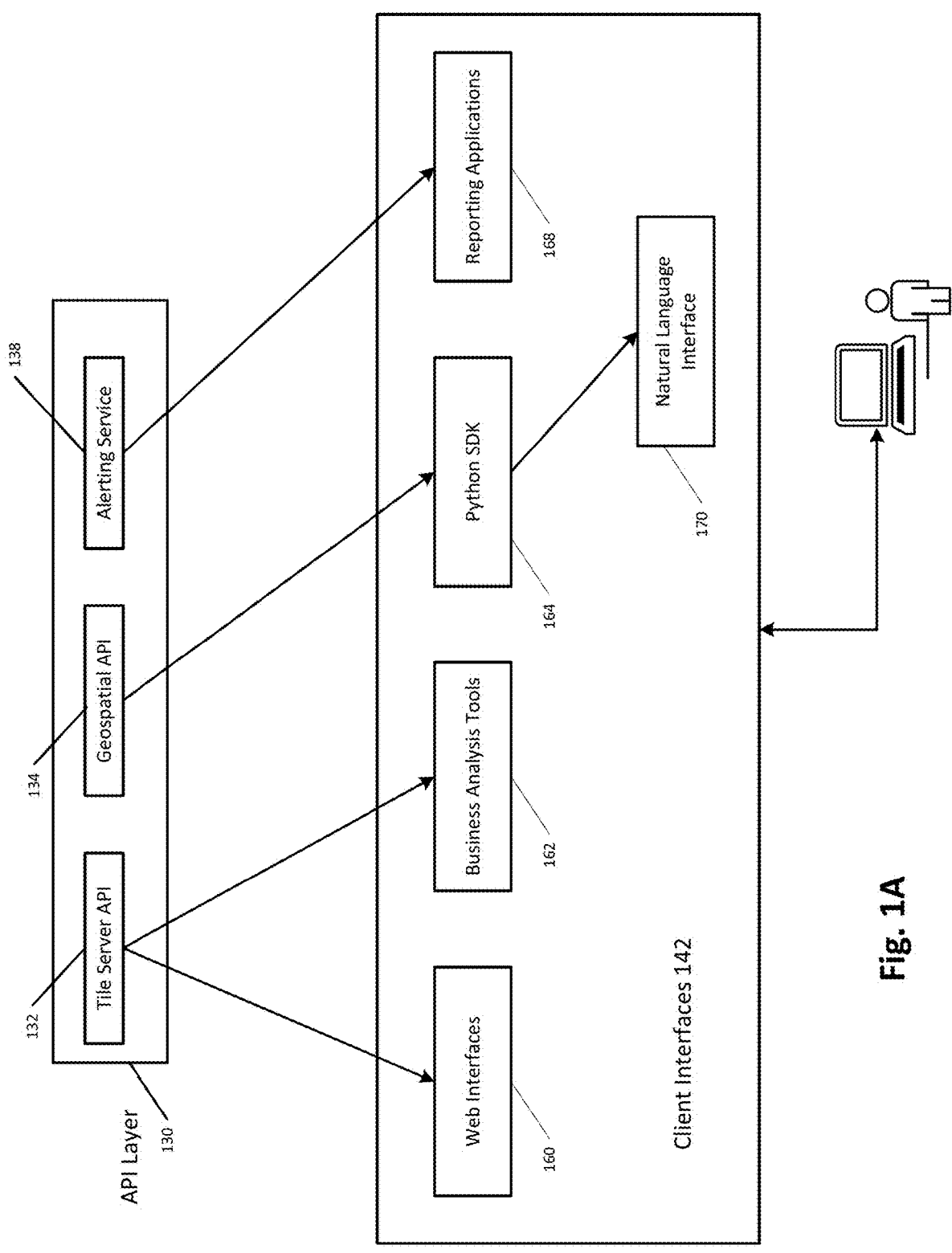
FIG. 1A is a diagram of the client interfaces of FIG. 1, according to various embodiments of the present invention.

End users may access the system through a variety of client interfaces (142), as shown in FIG. 1A, each supporting different interaction styles and accommodating varying levels of technical proficiency. These interfaces enable access to components of the API layer (130), including the tile server API (132), the geospatial API (134), and the alerting service (138), depending on the type of task or query being performed. In some implementations, the client interfaces (142) include web interfaces (160), such as browser-based dashboards implemented using JavaScript frameworks (e.g., React or Angular). These dashboards may provide interactive visualizations of geospatial alerts, map-based overlays, and portfolio-level summaries.

For users engaged in financial analysis or operational risk management, business analysis tools (162) may be provided. These tools may be implemented as spreadsheet-integrated modules, custom Excel plugins, or enterprise BI dashboards (e.g., Microsoft Power BI or Tableau), allowing users to ingest geospatial alert outputs, visualize exposure metrics, and correlate alerts with financial performance indicators.

More technical users, such as developers or data scientists, may utilize a Python software development kit (SDK) (164). The SDK may expose a programmatic interface to backend services, including the geospatial API (134), tile server API (132), and alerting service (138), thereby enabling automation of spatial queries, rule submission, and bulk alert processing. In some embodiments, the SDK includes helper functions, authentication wrappers, and structured result parsers for common alerting and exposure analysis tasks.

The SDK (164) may further interface with a natural language interface (170), enabling non-technical users to configure alerts or query spatial exposures using plain English. The natural language interface (170) may be built atop natural language processing (NLP) frameworks, optionally incorporating pretrained large language models or fine-tuned domain-specific models. For instance, users may input commands such as "alert me if flooding is near any of our properties in Louisiana," which are then parsed and translated into structured geospatial queries or alerting rules.

Additional reporting applications (168) may be used to generate formal summaries of geospatial exposure, alert history, or ESG compliance metrics. These applications may run as standalone desktop tools or cloud-based services, and may output standardized reports in formats such as PDF, DOCX, or JSON for downstream ingestion.

Each of these client interfaces (160, 162, 164, 168, 170) provides a communication pathway between end users and the respective components of the API layer (130). For example, web interfaces (160) and business tools (162) may rely primarily on the tile server API (132) and the geospatial API (134), while the SDK (164) and NLP interface (170) may access all three core APIs. Reporting applications (168) may be configured to pull data from both the alerting service (138) and the geospatial API (134), enabling the creation of customized summaries for different departments or regulatory needs.

In operation, the architecture shown in FIGS. 1 and 1A enables ingestion of heterogeneous geospatial data sources, their normalization into a common spatial index (e.g., via H3 or similar spatial encodings), linkage to financial assets, and automated generation of alerts for real-time financial risk monitoring. The modularity of the pipeline allows the system to accommodate new data formats and use cases with minimal reconfiguration. For example, newly ingested data can be exposed to users via updated map tiles, fresh alert triggers, or NLP-accessible endpoints without altering the underlying infrastructure. The API layer (130), comprising the tile server API (132), geospatial API (134), and alerting service (138), supports both automated integration with external enterprise systems and direct user interaction via the client interfaces (142). This dual-mode access enables diverse workflows-from hands-on dashboard exploration to fully automated rule-based monitoring-supporting roles as varied as data scientists, compliance analysts, and portfolio managers.

Figure 2:
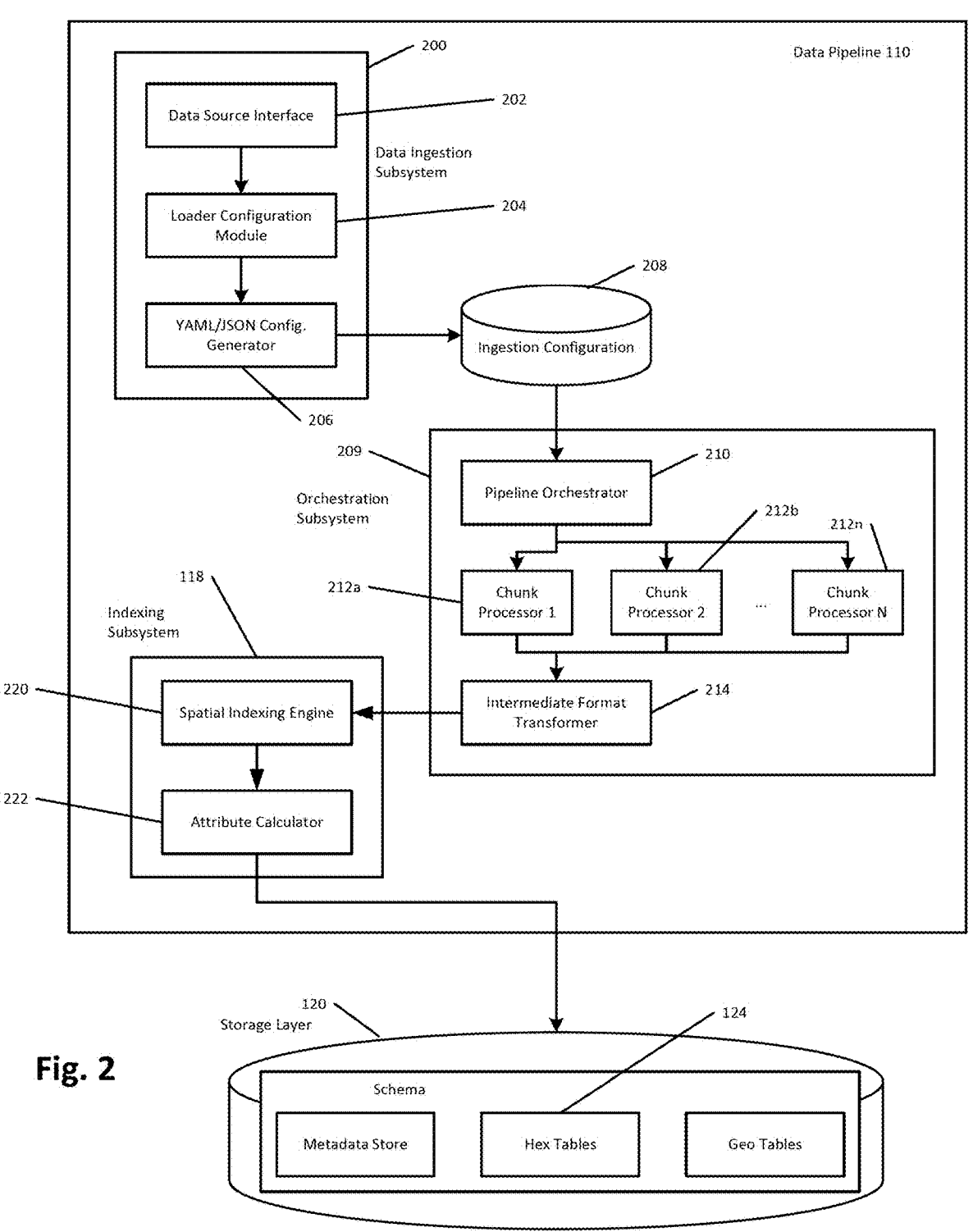
FIG. 2 is a diagram of an exemplary data ingestion pipeline of FIG. 1, showing geospatial data normalization, spatial indexing, and metadata enrichment, according to various embodiments of the present invention.

FIG. 2 illustrates an example architecture of the data pipeline (110), according to various embodiments of the present invention, configured to ingest, transform, spatially index, and store geospatial data. The pipeline (110) includes subcomponents that carry out the ingestion and normalization process prior to storage in the schema (124) of the storage layer (120). The pipeline may be implemented in a modular and containerized computing environment, and may execute across distributed infrastructure using general-purpose hardware such as x86-based servers or virtual machines. Software components may be implemented using modern high-level programming environments, such as Python or Java, and may be orchestrated using container orchestration tools like Kubernetes or Docker Compose.

The pipeline (110) includes a data ingestion subsystem (200), which can comprise a data source interface (202) configured to receive input geospatial data from one or more sources, such as URLs, file uploads, or real-time data streams. Supported data formats may include both raster and vector data, including but not limited to GeoJSON, Shapefile, KML/KMZ, GML, GeoTIFF, NetCDF, Arc ASCII, raster tiles, DEM files, geoparquet, and others. These formats may vary in projection, encoding, and schema, and may originate from heterogeneous systems or data providers.

A loader configuration module (204) selects an appropriate ingestion loader based on the format or metadata of the received input. This may involve identifying the expected schema, coordinate system, and parsing logic required to normalize the incoming file. A configuration generator (206) creates a declarative ingestion configuration, such as a YAML or JSON document, which defines the source path, transformation steps, and target schema structure. This configuration is stored in an ingestion configuration repository (208), which may also serve as a registry of available datasets and ingestion profiles.

An orchestration subsystem (209) receives the ingestion configuration and manages execution of the pipeline. The orchestration subsystem corresponds to the orchestrated processing component of the data pipeline (110) in FIG. 1 and may be implemented using a workflow orchestration engine such as Apache Airflow, Prefect, or similar tools capable of defining DAG-based (directed acyclic graph) processing logic. A pipeline orchestrator (210) interprets the ingestion configuration and divides large input datasets into segments or chunks. Each chunk is assigned to a separate chunk processor (212a-212n), allowing for parallelized execution across multiple compute nodes. Within each chunk processor, data is normalized into an intermediate format via an intermediate format transformer (214). The intermediate format may include harmonized attribute schemas and geometries expressed in a consistent spatial reference system (e.g., WGS 84/EPSG: 4326), suitable for subsequent indexing.

The normalized data is then passed to an indexing subsystem (118), corresponding to the H3 indexer (118) shown in FIG. 1. The indexing subsystem includes a spatial indexing engine (220) that converts geometries-such as polygons or multipolygons-into a collection of spatial cells according to a selected spatial index. In a preferred embodiment, the spatial indexing engine uses the open-source H3 spatial indexing system, which tessellates the globe into a hierarchy of hexagonal cells at multiple resolutions. Other indexing systems, such as quadtrees or the Google S2 library, may also be used in alternative embodiments. The indexing process may include polyfilling irregular geometries into cell sets, applying resolution-specific filters, and computing adjacency or neighborhood relationships.

An attribute calculator (222) can compute derived values for each indexed cell. These values may include dataset identifiers, timestamps, hazard levels, source attribution, jurisdictional codes, or other spatial or financial metadata. In some embodiments, attributes may be determined from source data, calculated from derived properties (e.g., area or perimeter of the cell), or inferred by evaluating user-defined rules or threshold conditions. The attribute calculator may be implemented as a standalone microservice or as part of the indexing engine (220).

Following indexing and enrichment, data is stored in the storage layer (120), also shown in FIG. 1, using a structured schema (124) that includes a metadata store, geo tables, and hex tables. The geo tables store original geometries as ingested, enabling high-fidelity reconstruction, provenance validation, and compliance auditing. The hex tables store H3-indexed (or otherwise indexed) spatial representations of the geometries, including per-cell attributes. The metadata store may maintain lineage records, ingestion timestamps, source licensing terms, access control tags, and refresh schedules, supporting the system's auditability and security requirements. The underlying storage may be implemented using a PostgreSQL database with PostGIS and H3 extension support, although other relational or spatially enabled database systems may also be used.

The pipeline architecture depicted in FIG. 2 allows for fully automated, configuration-driven ingestion and normalization of complex geospatial data. By leveraging parallelization and modular transformation stages, the system can scale to support large files and frequent updates, including high-volume raster feeds and multi-gigabyte vector archives. The indexing subsystem ensures that all data can be converted into a unified, resolution-consistent representation suitable for rapid spatial queries, automated alerting, and integration with financial and operational systems. When deployed in conjunction with the API layer and alerting services described with respect to FIG. 1, this pipeline provides the foundation for spatially aware decision-making in risk-sensitive domains such as finance, insurance, ESG compliance, and logistics.

Figure 3:
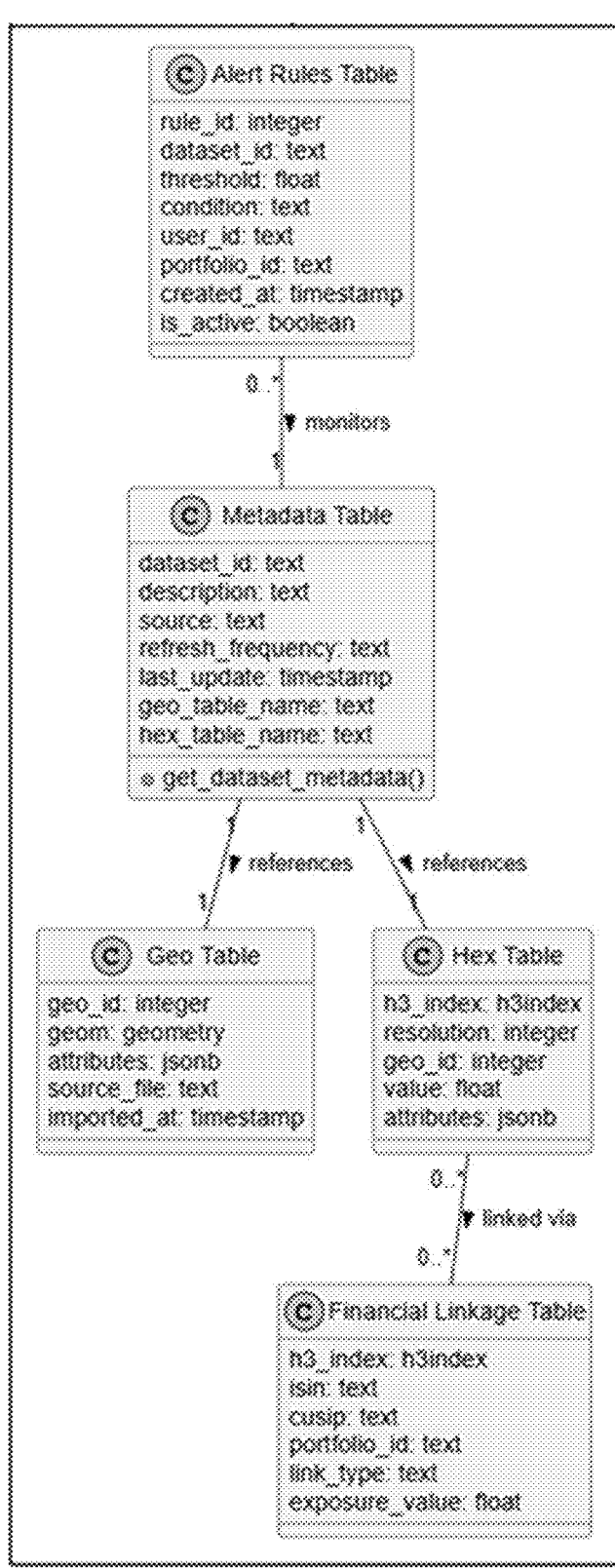
FIG. 3 illustrates an exemplary database schema that may be used to implement the storage layer shown in FIG. 1, according to various embodiments of the present invention.

FIG. 3 illustrates an exemplary database schema that may be used to implement the storage layer (120) shown in FIG. 1 and referenced in connection with the data pipeline (110) of FIG. 2. In the illustrated embodiment, the schema is implemented using a PostgreSQL relational database management system extended with PostGIS and H3 geospatial indexing capabilities. The schema enables structured, queryable storage of both raw and indexed geospatial data, metadata, alerting rules, and financial asset linkages.

As shown, the schema includes a Metadata Table, which serves as a central catalog for all ingested datasets. Each row in the Metadata Table specifies a unique dataset_id along with descriptive fields such as description, source, and refresh_frequency. Timestamps for the most recent update (last_update) are stored alongside the database table names corresponding to the dataset's raw and indexed representations (geo_table_name and hex_table_name, respectively). The metadata table may support query functions such as get_dataset_metadata( ) to enable dynamic retrieval of dataset-level configuration and lineage information, and may be used by orchestration components (e.g., 206/209 in FIG. 2) during ETL operations or downstream access by the API layer (e.g., 130 in FIG. 1).

The Metadata Table references two primary storage tables: a Geo Table and a Hex Table. The Geo Table stores raw geospatial geometries using a geom field typed as a PostGIS-compatible geometry object. Each geometry is uniquely identified by a geo_id and may be associated with a source_file, an imported_at timestamp, and additional metadata captured in a JSONB field (attributes). This table corresponds to the raw geometry storage illustrated in FIG. 2 (block 124, "Geo Tables"), and it allows preservation of source data for compliance, traceability, and visualization.

The Hex Table represents the same data transformed into an indexed format using H3 spatial indexing, as performed by the spatial indexing engine (220) in FIG. 2. Each row in the Hex Table includes an h3_index corresponding to a hexagonal cell at a particular spatial resolution (resolution), and links to the source geo_id from which the cell was derived. Associated value and attributes fields (also using JSONB) store cell-level data used for computation, filtering, and alerting. This table corresponds to the "Hex Tables" component of storage layer 124 in FIG. 1, and supports high-performance querying, aggregation, and geospatial joins.

To associate indexed geospatial cells with financial entities, the schema includes a Financial Linkage Table. This table allows each H3 index (h3_index) to be linked to one or more financial identifiers such as an international securities identification number (isin), a CUSIP (cusip), or a portfolio_id. A link_type field allows the relationship to be classified (e.g., direct facility match, proximity-based exposure, supply chain adjacency), and a numeric exposure_value may be used for weighting in risk models or impact assessments. This table provides the linkage referred to in FIG. 1 between the storage layer and the financial systems (140), and enables downstream risk analytics, reporting, and alerting functions.

The Alert Rules Table stores definitions for user-specified spatial alert conditions. Each rule may be associated with a specific dataset_id, a numerical threshold, a logical condition expression (e.g., "value>threshold"), and a user_id or portfolio_id that scopes the alert to a particular user or asset group. The rule may include timestamps (created_at) and an is_active flag. The Alert Rules Table references the Metadata Table and enables the alerting functionality described in connection with the rule engine and alerting service (see 132 and 134 in FIG. 1). The defined rules allow real-time or scheduled evaluations of spatial data conditions over indexed data, enabling automated generation of notifications and integration with client systems.

As a whole, the schema shown in FIG. 3 facilitates modular, scalable, and traceable storage of spatial datasets and their linkages to financial assets. It supports consistent querying and access patterns across datasets, simplifies integration with downstream analytics and alerting systems, and forms the persistent data backbone of the platform architecture introduced in FIGS. 1 and 2.

Figure 4:
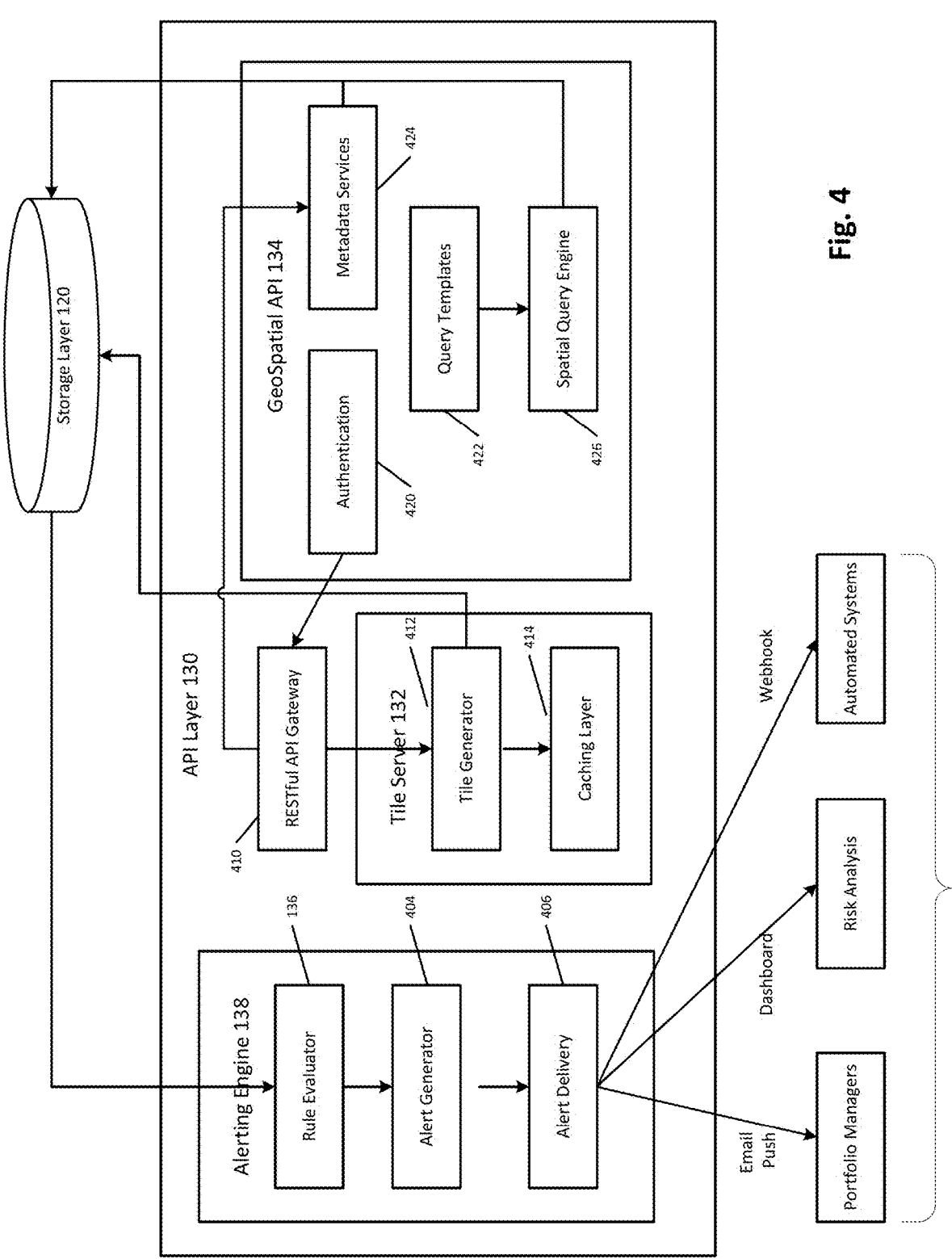
FIG. 4 illustrates an example architecture of an API and alerting system, according to various embodiments of the present invention.

FIG. 4 illustrates an example architecture of an API and Alerting System, designated generally as API Layer 130, which interacts with the Storage Layer 120 to enable automated, rule-based financial risk monitoring based on geospatial data. As shown, the API Layer 130 comprises three principal components: Alerting Engine 138, Tile Server 132, and Geospatial API 134. These components expose services and interfaces for both machine-to-machine and human-in-the-loop interactions, enabling users and systems to query geospatial data, register alert rules, and receive automated notifications based on spatial triggers. In various embodiments, the components of API Layer 130 may be implemented using cloud-based microservices (e.g., containerized REST APIs deployed on Kubernetes), or integrated within an enterprise server environment with dedicated hardware resources (e.g., x86-64 processors, 64-256 GB RAM, SSD-backed PostgreSQL database, and GPU-accelerated geospatial engines).

The Alerting Engine 138 can support automated monitoring of geospatial conditions relative to financial assets or portfolios. It can include the Rule Evaluator 136 (see FIG. 1), which can periodically retrieve and evaluates alert rules stored in the Alert Rules Table (see FIG. 3) against incoming or updated spatial data stored in Hex Tables or Geo Tables of the Storage Layer 120. These rules may include user-defined thresholds, geometric conditions (e.g., point-in-polygon), or temporal triggers (e.g., data freshness or rate of change). In one implementation, the Rule Evaluator 136 may be built using a rule-processing framework such as Drools or a custom engine written in Python, Java, or Go.

If an alert rule condition is satisfied, the Alert Generator 404 can construct a notification payload, which may include the rule ID, affected portfolio or asset, matched geometry, timestamp, and a descriptive message. The Alert Delivery module 406 routes the alert to designated recipients using one or more delivery mechanisms, including email push, dashboard integration, and webhooks. For example, alerts may be sent to a portfolio manager via secure email (e.g., SMTP with TLS), displayed in a real-time monitoring dash-board rendered via React or Angular, or delivered to down-stream automated systems via JSON payloads posted to webhook URLs.

The Tile Server 132 can support visualization of geospa-tial data layers. It can include a Tile Generator 412, which converts underlying geospatial data from the Storage Layer 120 into pre-rendered or dynamically generated map tiles, such as PNG or vector tilesets (e.g., Mapbox Vector Tiles). These tiles may represent H3-indexed data, raw geometries, or overlayed analytical results. A Caching Layer 414 stores frequently requested tiles using an in-memory cache (e.g., Redis or Memcached), thereby reducing latency and back-end query load. The Tile Server 132 may be implemented using open-source libraries such as Mapnik, Tippecanoe, or the MapServer project, and it may expose tiles in standard formats via HTTP(S) endpoints.

The Geospatial API 134 can expose query and metadata services via standardized REST endpoints. It includes an Authentication module 420, which validates user credentials or API tokens (e.g., via OAuth 2.0, JWT, or SAML), and enforces role-based access control (RBAC) for sensitive data. The Query Templates module 422 stores parameterized query patterns that allow users to retrieve geospatial data based on common operations (e.g., "all polygons within X km of point Y", "intersections with asset buffer zones", etc.). These templates may be defined in SQL, GeoJSON, or custom DSLs, and stored in the Metadata Table (see FIG. 3).

A Spatial Query Engine 426 executes user-submitted queries or pre-defined templates by interacting directly with the Storage Layer 120. It supports geometric predicates such as intersection, containment, proximity, and distance mea-surement, and is optimized for H3-indexed lookups. In one implementation, the Spatial Query Engine 426 may be built atop PostgreSQL with PostGIS and Uber H3 extensions, using server-side functions and spatial indexes (e.g., GIST indexes for geometry and B-tree for H3 cell lookups). In high-throughput scenarios, the engine may also leverage a distributed query layer (e.g., Apache Druid, ClickHouse, or Amazon Redshift Spectrum) to support large-scale, feder-ated spatial analytics.

The RESTful API Gateway 410 can serve as the unified access point for all external interactions with API Layer 130. It handles routing of HTTP(S) requests to the appropriate internal services (e.g., alerting, query execution, tile gen-eration), applies request validation and logging, and may implement rate limiting or IP-based access control. In some implementations, the API Gateway 410 is implemented using platforms such as Kong, AWS API Gateway, or NGINX with Lua scripting.

Finally, the API and Alerting System interacts with Data Consumers, which may include Portfolio Managers, Risk Analysts, and Automated Systems, as shown at the bottom of FIG. 4. These consumers may receive alert notifications and spatial query results via multiple channels: email push notifications, interactive dashboards, or webhook endpoints integrated into downstream decisioning systems (e.g., trade execution platforms, risk scoring engines, or compliance monitoring tools). For example, an alert indicating that a wildfire polygon intersects the geofenced region of a pro-duction facility linked to a specific bond may trigger a webhook alert to a portfolio management system, which in turn adjusts risk exposure metrics for that bond in real time.

Figure 5:
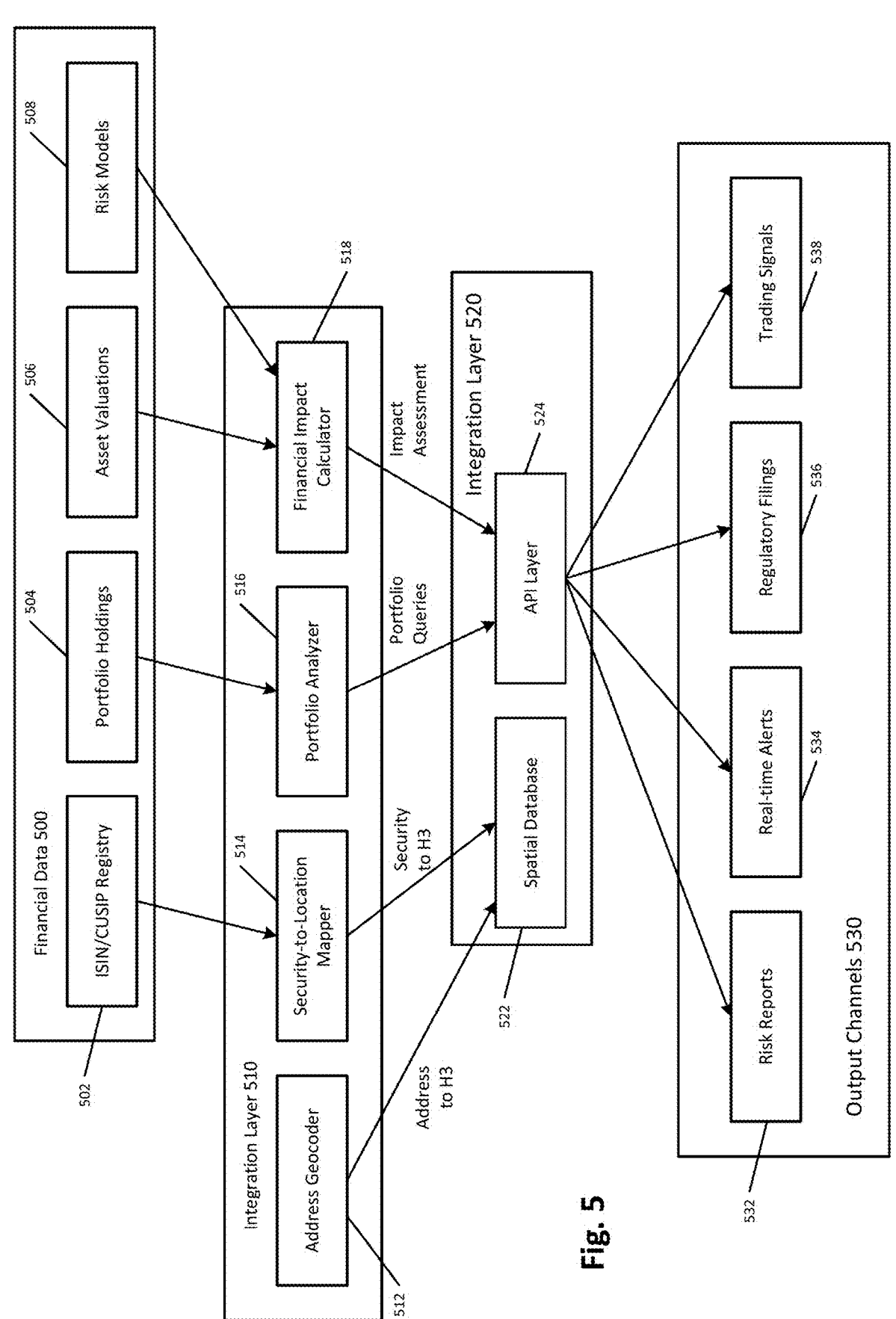
FIG. 5 illustrates an example architecture for integrating the financial systems of FIG. 1 with the geospatial data processing components of the system, enabling linkage between geospatial information and financial instruments, portfolio data, and valuation models to support real-time risk assessment, reporting, and decision support, according to various embodiments of the present invention.

FIG. 5 illustrates an example architecture for integrating the financial systems (140) of FIG. 1 with the geospatial data processing components of the system, enabling linkage between geospatial information and financial instruments, portfolio data, and valuation models to support real-time risk assessment, reporting, and decision support. The illustrated exemplary architecture includes a financial data layer (500), an integration layer (510), a core processing layer (520), and a set of output channels (530), each of which contributes to the ingestion, enrichment, and operationalization of spatial and financial data.

The financial data layer (500) aggregates multiple sources of financial information relevant to portfolio management and securities analysis. These may include an ISIN/CUSIP registry (502) for instrument-level identifiers, portfolio hold-ings data (504) detailing the positions maintained by asset managers, asset valuations (506) reflecting real-time or historical pricing information, and risk models (508) that quantify exposure to various financial factors or scenarios. These data sources may be obtained from third-party market data providers, custodians, or internal enterprise databases, and may be accessed through secure API endpoints, flat file transfers, or real-time message buses.

The integration layer (510) can be configured to associate the ingested financial data with corresponding geospatial representations. An address geocoder (512) transforms tex-tual location descriptors-such as facility addresses, issuer headquarters, or borrower property locations-into standard-ized geospatial formats, such as H3 index cells or latitude/ longitude coordinates. The security-to-location mapper (514) then links individual financial instruments to one or more geospatial entities. For example, a commercial mort-gage-backed security may be associated with multiple build-ing parcels in a metropolitan area, each represented by an H3 cell or polygon identifier. The portfolio analyzer (516) aggregates these mappings at the portfolio level, enabling exposure analysis to spatial events or geographic zones. A financial impact calculator (518) computes quantitative met-rics of exposure and sensitivity, translating geospatial events-such as natural disasters, regulatory zone updates, or ESG-relevant occurrences-into estimated changes in asset valuations, risk scores, or compliance statuses.

These integration-layer components may be implemented as microservices deployed within a container orchestration platform, such as Kubernetes. Each component may com-municate over internal gRPC or RESTful APIs, and may use shared data serialization protocols (e.g., Protobuf or Apache Avro) to ensure interoperability. The address geocoder (512) may rely on open-source libraries such as Pelias or com-mercial services like Google Maps Platform, while the security-to-location mapper (514) may maintain a time-indexed lookup table between security identifiers and geo-spatial entities in a distributed in-memory store, such as Redis or Apache Ignite.

The outputs of the integration layer (510) are passed into a centralized processing layer (520), which includes a spatial database (522) and an API layer (524). The spatial database may be implemented using PostGIS, Apache Sedona, or other high-performance geospatial stores, and is used to persist the mappings, event footprints, spatial queries, and entity linkages described above. The API layer (524), described in more detail with respect to FIGS. 1 and 4, serves as the primary access point for external and internal consumers of the spatial-financial data, and enables both push-based and query-based interactions through REST, GraphQL, or message-based protocols.

Finally, the output channels (530) expose the enriched data and analytics to downstream systems and stakeholders via multiple delivery pathways. These output components may include risk reports (532), real-time alerts (534), regulatory filings (536), and trading signals (538). Risk reports (532) may be automatically generated using the outputs of the portfolio analyzer and impact calculator, may include quantitative exposure summaries, visual overlays, and narrative commentary tailored to risk management stakeholders. Real-time alerts (534) may be delivered through webhooks, email, or message queues (e.g., Kafka or RabbitMQ), notifying portfolio managers of geospatial events affecting their holdings. Regulatory filings (536) may be prepared in accordance with ESG disclosure standards, using templates populated by the system's financial impact calculations. Trading signals (538) may be derived from spatially driven changes in asset risk, and may be consumed by algorithmic trading engines or portfolio rebalancing systems.

In various implementations, the architecture of FIG. 5 enables dynamic, location-aware insights across the financial system. The modular design supports flexible integration with enterprise data environments, scalable cloud-native deployment, and seamless extension to new geospatial or financial domains, thereby providing a foundation for enhanced spatial-financial analytics and automated decision-making.

Figure 6:
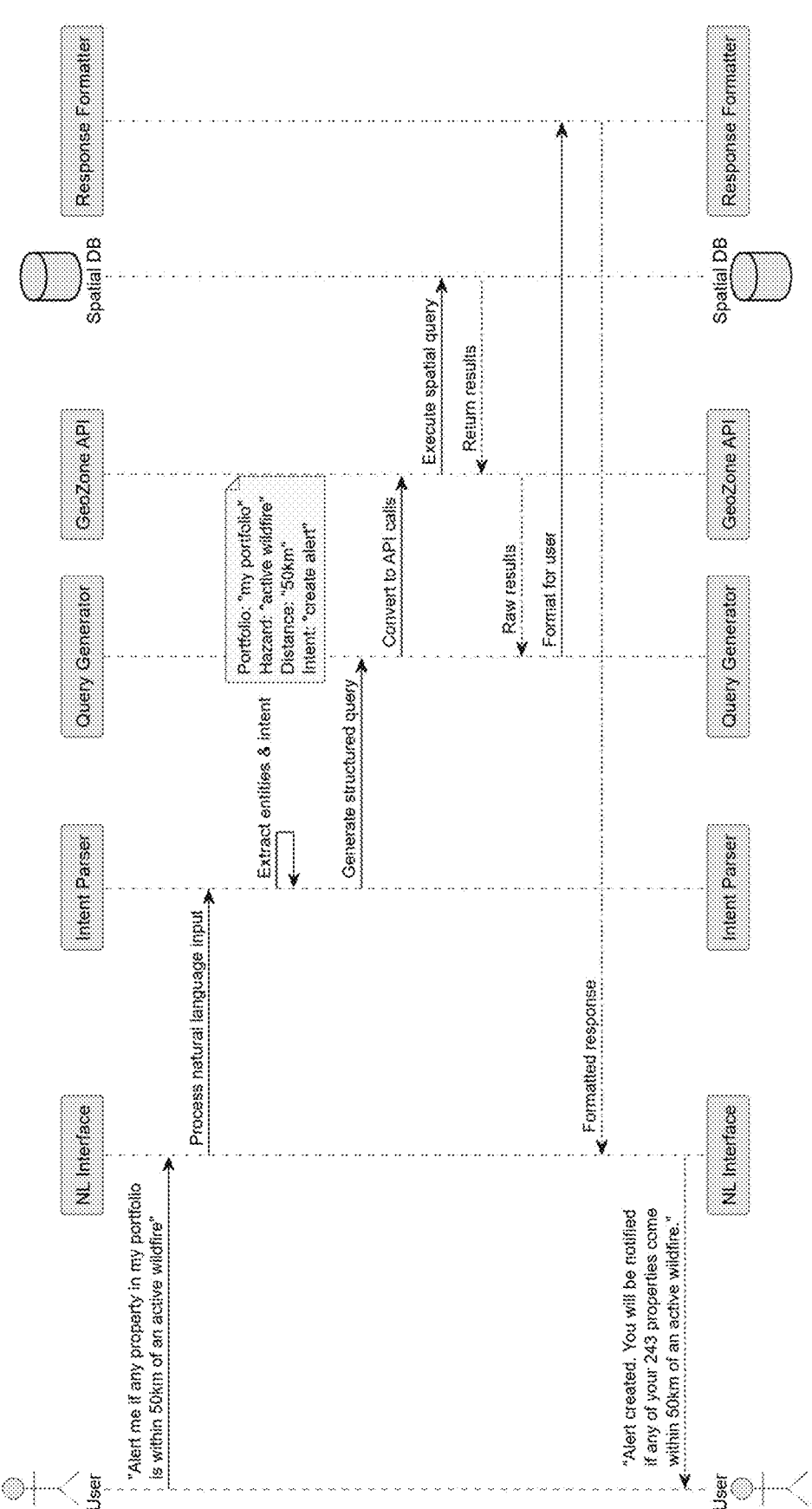
FIG. 6 illustrates a representative natural language interface flow for interacting with the geospatial risk assessment system using plain English commands or queries, according to various embodiments of the present invention.

FIG. 6 illustrates a representative natural language interface flow for interacting with the geospatial risk assessment system using plain English commands or queries. This interface corresponds to the natural language interface (170) shown in FIG. 1A and allows users-such as portfolio managers, analysts, or compliance officers-to interact with the system without requiring specialized knowledge of spatial query syntax, geospatial APIs, or technical dashboards. The natural language interface (170) includes software modules configured to parse user input, identify relevant domain entities, construct structured spatial queries, and return results in a human-readable format.

In the illustrated embodiment, the user initiates a request through the NL Interface (natural language interface), which may be implemented as a web-based input field, chat-based interface, or voice-driven assistant. The system receives natural language text, such as "Alert me if any property in my portfolio is within 50 km of an active wildfire." This input is first processed by the Intent Parser, which uses natural language processing (NLP) techniques—e.g., transformer-based language models or rule-based pattern matching-to extract the intended action (e.g., "create alert") and relevant entities, such as portfolio identifiers ("my portfolio"), hazard types ("active wildfire"), and spatial parameters (e.g., radius distance of 50 km).

Next, the Query Generator constructs a structured representation of the user's intent, such as a JSON object or structured query language (SQL)-like command, suitable for backend processing. This structured query is passed to the GeoZone API, which serves as an interface to the geospatial execution layer. The GeoZone API translates the structured query into one or more spatial database operations—for example, calculating H3 cell intersections or performing radius-based proximity lookups-executed against the underlying Spatial Database. In one implementation, the spatial database may include a PostGIS-enabled PostgreSQL instance, with extensions for hexagonal indexing and geohash optimizations.

The raw query results—such as lists of matching properties or intersecting hazard zones—are returned to a Response Formatter, which transforms them into a human-readable summary. The Response Formatter may apply templated rendering logic, natural language generation (NLG), or guided explanation techniques to produce a response such as: "Alert created. You will be notified if any of your 243 properties come within 50 km of an active wildfire." The formatted output is returned to the user via the NL Interface, completing the round-trip conversational workflow.

The natural language interface (170) provides a flexible mechanism for alert setup, data retrieval, and spatial risk explanation using everyday language. It is particularly beneficial for non-technical users who may not be proficient with dashboard tools or spatial query languages, but who nonetheless require access to real-time geospatial risk intelligence for their portfolios. In some implementations, the interface may also support follow-up queries, interactive clarification (e.g., "Do you mean wildfire or controlled burn?"), and session-based memory to support multi-turn dialogues.

Figure 7:
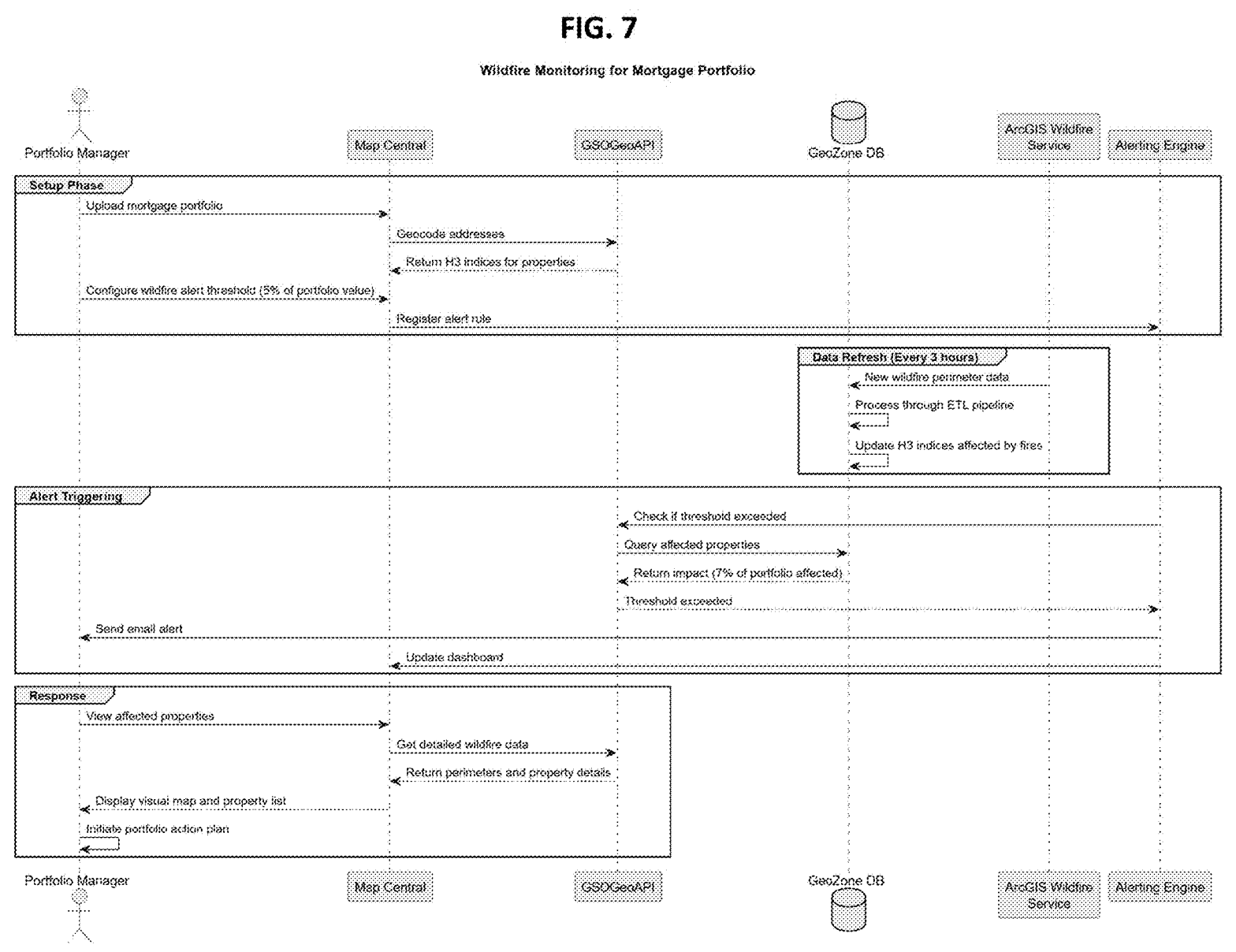
Figure 8:
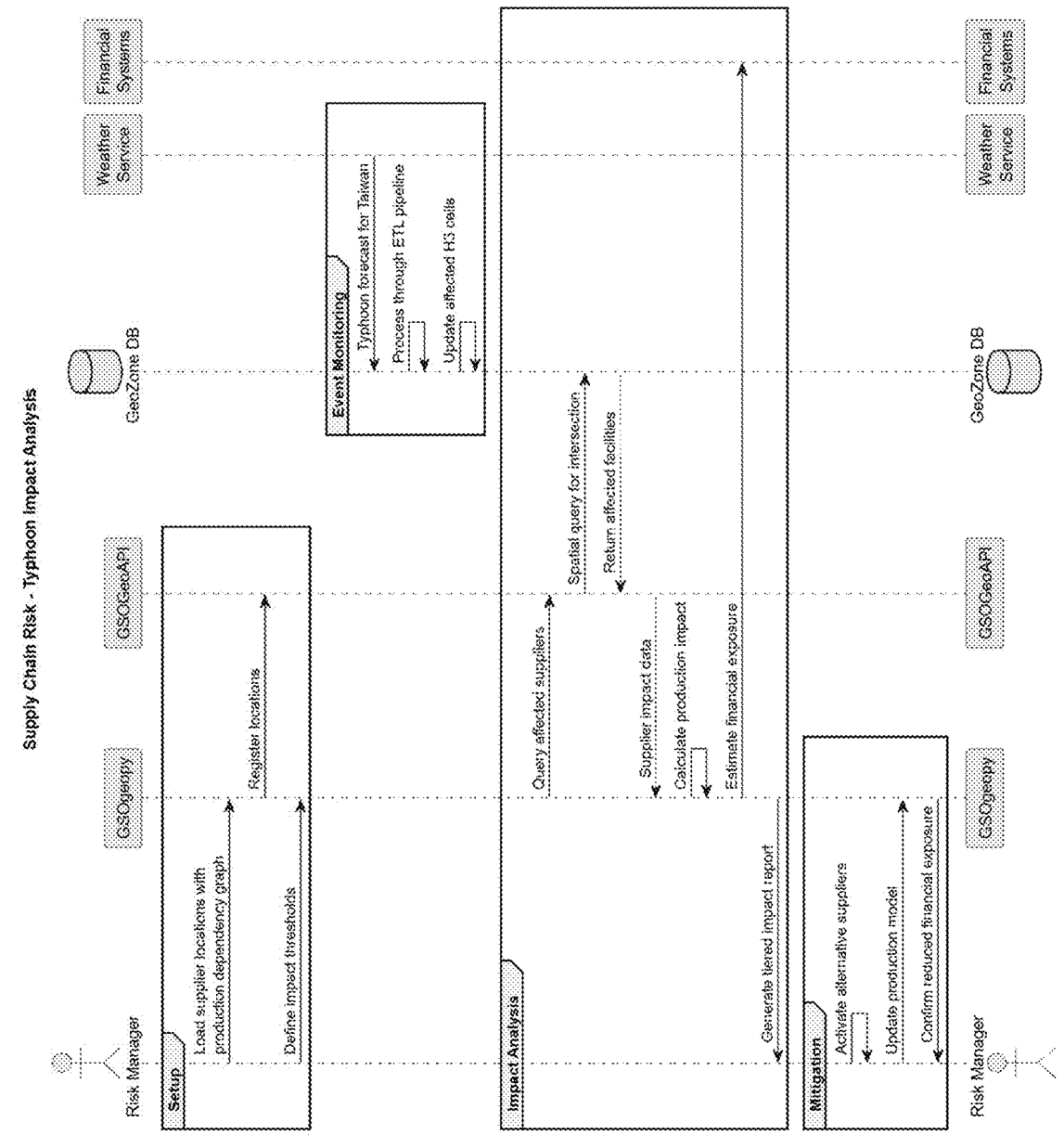
Figure 9:
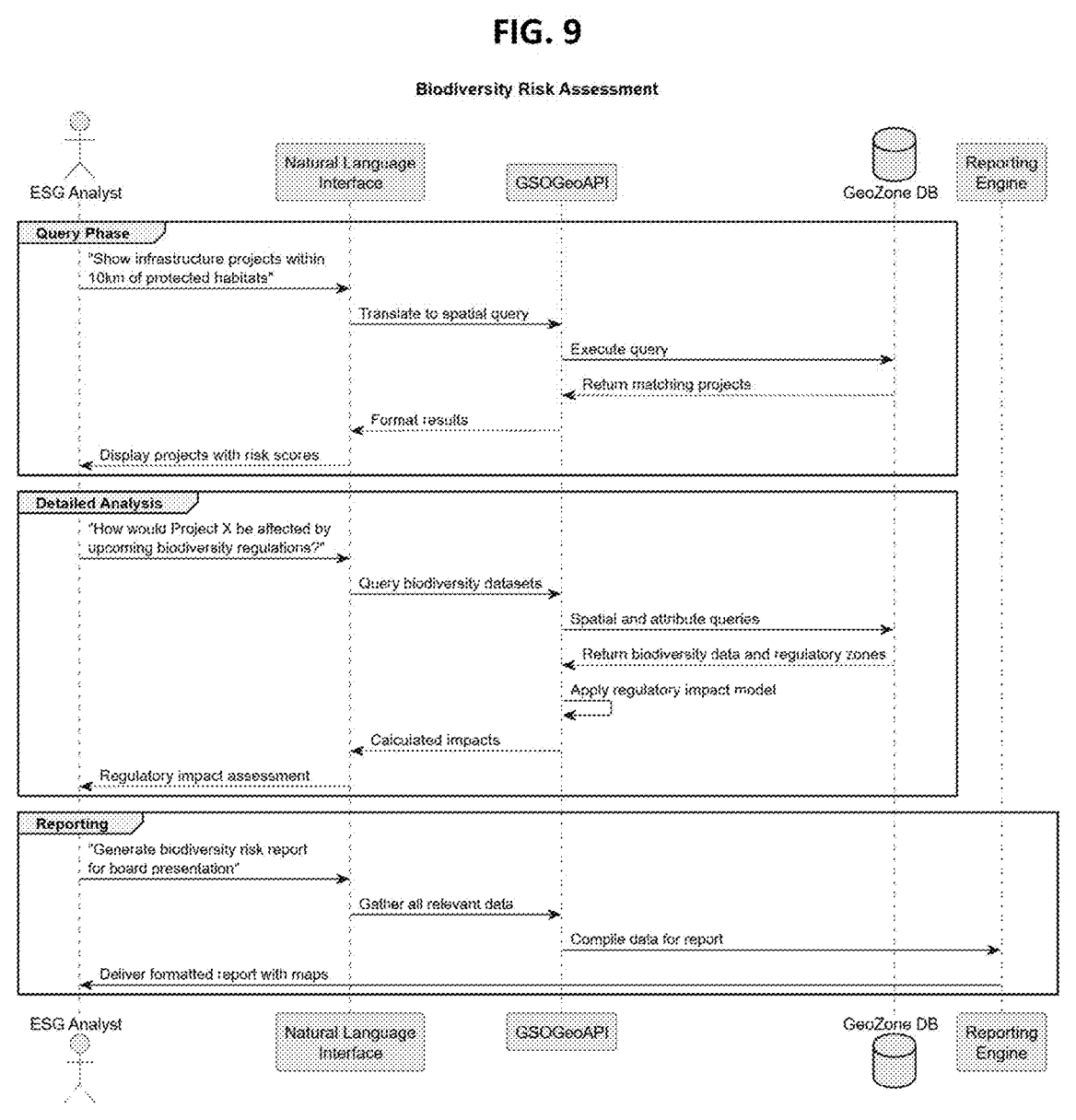

FIGS. 7 through 9 illustrate a set of exemplary use cases that demonstrate how the disclosed geospatial-financial integration platform can be applied in practical scenarios involving real-time spatial risk monitoring, supply chain resilience analysis, and environmental risk assessment. Each use case leverages components of the core architecture-including the GeoZone database, geospatial APIs, ETL pipelines, alerting engines, and client-facing interfaces-to support automated decision-making and risk mitigation for geographically-linked financial assets and operations.

As shown in the example of FIG. 7, the system can be used to perform wildfire monitoring for a mortgage portfolio. In this example, a portfolio manager initiates a setup phase by uploading a mortgage portfolio dataset containing property addresses. These addresses are geocoded by a third-party geocoding service, and converted into spatial indices (e.g., H3 indices) using the GSOGeoAPI, with results stored in the GeoZone database. The portfolio manager configures a wildfire alert threshold (e.g., 5% of total portfolio value) and registers an associated alert rule within the system. Periodically—e.g., every three hours—the system ingests new wildfire perimeter data from an external geospatial data service (such as a wildfire mapping provider), processes it through an extract-transform-load (ETL) pipeline, and updates the set of affected H3 indices in the GeoZone database. During the alert triggering phase, the system automatically checks whether the configured threshold has been exceeded, based on an updated query of affected properties and a computed impact value (e.g., 7% of the portfolio affected). If the threshold is surpassed, the alerting engine sends a notification (e.g., via email) and updates the user dashboard. In the response phase, the portfolio manager can view visual maps and property-level impact summaries and initiate an appropriate portfolio-level action plan.

FIG. 8 depicts a supply chain risk management use case example, focusing on the impact of typhoon events on production facilities. In the setup phase, a risk manager loads supplier location data—along with a production dependency graph—and registers these locations with the GSOGeoAPI. The user also defines one or more impact thresholds for subsequent monitoring. During the event monitoring phase, the system receives a weather forecast (e.g., a typhoon forecast for Taiwan), processes the forecast data through an ETL pipeline, and updates the set of H3 spatial cells projected to be affected. In the impact analysis phase, the system performs a spatial intersection query to determine which suppliers fall within the affected areas, returning a list of impacted facilities. These data are used to calculate both production impacts (e.g., lost output) and estimated financial exposure. The system then generates a tiered impact report, providing a structured output of risk levels. In the mitigation phase, the risk manager may activate alternate suppliers, update the production model, and confirm—via interaction with the system—that the overall financial exposure has been reduced.

The example of FIG. 9 illustrates a biodiversity risk assessment workflow involving an ESG analyst evaluating infrastructure projects relative to protected habitats and regulatory constraints. In the query phase, the analyst interacts with a natural language interface to issue queries such as "Show infrastructure projects within 10 km of protected habitats." These queries are parsed and translated into structured spatial queries, which are executed by the GSO-GeoAPI in coordination with the GeoZone database. Matching projects are returned and risk scores are displayed to the analyst. In the detailed analysis phase, the analyst may invoke regulatory impact queries (e.g., "How would Project X be affected by upcoming biodiversity regulations?"), prompting the system to retrieve biodiversity and regulatory zone data. The system applies one or more regulatory impact models to compute project-specific effects, and returns a calculated impact assessment. In the final reporting phase, the analyst requests the generation of a biodiversity risk report for stakeholder review. The system gathers relevant data, compiles a formatted report (e.g., with maps, tables, and impact scores), and delivers the report output via the reporting engine.

Collectively, these examples illustrate how the disclosed system supports domain-specific workflows in diverse contexts-ranging from real estate risk, to supply chain disruption, to ESG compliance-by integrating geospatial analytics with financial and regulatory data pipelines, alerting frameworks, and interactive client interfaces.

Referring back to FIG. 1, the components of the overall system architecture may be implemented using modern enterprise software development frameworks and deployed within containerized environments orchestrated by Kubernetes or equivalent orchestration platforms. For example, the data ingestion pipeline (110) and indexing module (118) may be deployed as horizontally scalable microservices written in Python or Java, each running within Docker containers managed by a Kubernetes cluster. These services may use Apache Kafka or AWS Kinesis for ingesting high-throughput, real-time data feeds (e.g., wildfire perimeters or weather forecasts), while batch loads may be scheduled using Airflow DAGs that invoke containerized transformation jobs running in parallel.

The persistent storage layer (120), including both the geo tables (126) and hex tables (124), may be implemented using a PostgreSQL database augmented with the PostGIS extension for spatial operations and the H3 extension for hexagonal indexing. In deployments that require high availability and fault tolerance, PostgreSQL may be configured for replication and failover using Patroni or a cloud-managed equivalent such as Amazon RDS for PostgreSQL.

Performance for complex queries involving joins or aggregations over spatial datasets may be improved using query acceleration tools like pg_partman for time-based partitioning or Citus for distributed Postgres clustering.

The components of the API layer (130), shown in FIGS. 1, 1A, and 4, may be exposed via REST or GraphQL endpoints served by containerized services written in Python (e.g., using FastAPI or Flask), Node.js (e.g., using Express), or Go. These services may include built-in middleware for authentication and access control using OAuth 2.0 or OpenID Connect. The Geospatial API (134) may internally invoke spatial queries using PostGIS SQL functions, or may abstract these queries using an ORM such as SQLAlchemy or Django ORM with spatial support. In high-performance deployments, the API layer may also include a caching layer-such as Redis or Varnish-to reduce load on the underlying database for frequently accessed spatial queries.

The Alerting Engine (138) and Rule Evaluator (136), as described in FIGS. 1 and 4, may be implemented as event-driven microservices. These components may subscribe to message queues (e.g., RabbitMQ or Apache Pulsar) to receive notifications about newly ingested spatial data or modified rules, triggering rule evaluation workflows. Rules may be evaluated using a custom rule engine or existing frameworks such as Drools (for Java) or durable_rules (for Python). Rule definitions can be serialized as JSON and stored in a rules repository, which the engine periodically polls or receives push updates from. If a rule is satisfied, alert payloads may be sent via SMTP (for email), Slack or Teams webhooks, or integrated into enterprise service buses for delivery to downstream systems.

The rules engine can be configured to evaluate one or more conditions associated with geospatial inputs, thresholds, or derived events. In some embodiments, machine learning models may be trained on historical geospatial and financial event data to assist in the creation, tuning, or prioritization of alert rules. These models can, for example, learn correlations between specific types of geospatial events (e.g., wildfire proximity, flood severity, or geopolitical disruptions) and subsequent financial impacts (e.g., bond volatility, insurance claims, or portfolio drawdowns), thereby enabling automated rule generation or confidence scoring of rule effectiveness.

As shown in FIGS. 1A and 6, the natural language interface (170) may leverage transformer-based language models such as BERT, ROBERTa, or a fine-tuned GPT variant, depending on the vocabulary and syntactic patterns commonly used by end users. Intent parsing may be performed using spaCy, HuggingFace Transformers, or commercial NLP platforms like Dialogflow. Entity extraction models may be fine-tuned using training data specific to financial asset names, geospatial regions, and hazard terms (e.g., "flood zone," "manufacturing site," or "50 km buffer"). The output of the NLP module may be transformed into structured query templates using a DSL (domain-specific language) interpreted by the Query Generator. This structured query may then be submitted to the same Geospatial API (134) used by programmatic clients.

With respect to the dashboard and reporting applications shown in FIGS. 1A, 5, and 9, front-end interfaces may be implemented using JavaScript frameworks such as React or Vue.js, and bundled with client-side libraries for map visualization such as Mapbox GL JS, Leaflet, or deck.gl. Reports generated by the system may be formatted using server-side rendering engines like Jinja2 (Python), PDFKit, or LaTeX-based pipelines, and may be distributed via file storage systems (e.g., Amazon S3) or secure delivery platforms (e.g., SFTP or API-based delivery via OAuth-authenticated endpoints).

Referring to FIG. 5, the financial systems integration components may be implemented as a federated set of services that communicate using asynchronous messaging or request/response APIs. For example, the portfolio analyzer (516) and financial impact calculator (518) may be implemented as stateless services that pull input data from the spatial database (522) and financial data lake or warehouse (e.g., Snowflake, Amazon Redshift, or Google BigQuery). Impact calculation logic may be expressed using domain-specific rules encoded in Python or R, and executed as Spark jobs for large-scale portfolios. These services may also support streaming evaluations using Apache Flink or Materialize for low-latency risk assessments.

In FIG. 5, the address geocoder (512/532) may use either proprietary APIs (e.g., Google Geocoding API, HERE API) or open-source alternatives such as OpenCage or Pelias, and may cache results to improve performance and minimize third-party API costs. Security-to-location mapping (514/534) may maintain bidirectional mappings using a key-value store (e.g., Redis) or graph database (e.g., Neo4j) to support complex relationships such as nested asset hierarchies or time-variant location linkages.

FIGS. 7 through 9, which illustrate example workflows for wildfire monitoring, supply chain disruption analysis, and biodiversity risk assessment, may be implemented using workflow automation platforms such as Apache Airflow or temporal.io. Each lane in the diagrams may correspond to a microservice or job node in a DAG, triggered either on a schedule (e.g., ETL updates every 3 hours) or in response to external events (e.g., weather forecast updates or NLP query submissions). The system may use service meshes such as Istio to enable secure, policy-driven communication between internal services, and centralized logging/observability stacks (e.g., ELK, Prometheus/Grafana) to monitor performance and detect anomalies in workflow execution.

Hardware infrastructure for supporting the described architecture may include high-availability server clusters with 32 to 128 CPU cores per node, 128-512 GB of RAM, and SSD-based storage arrays optimized for spatial query workloads. GPU-accelerated instances (e.g., using NVIDIA A100 or T4 cards) may be optionally provisioned for NLP inference, real-time map rendering, or large-scale spatial simulations. The system may also be deployed in cloud-native environments such as AWS, Azure, or GCP, using managed services such as AWS Lambda for stateless computation, Amazon Aurora for spatial databases, and S3 for geospatial asset storage.

Security and compliance requirements may be addressed by deploying all services within a VPC (Virtual Private Cloud) with IAM-based access control, encrypted storage volumes, audit logging, and continuous vulnerability scanning. Sensitive operations, such as alert delivery or portfolio mappings, may be wrapped in access policies enforced by reverse proxies (e.g., Envoy or Kong) or service meshes with built-in authorization checks. In high-security deployments, data may be anonymized or pseudonymized prior to processing, and H3 indices may be stored at coarse resolution levels to prevent reverse inference of asset locations.

Across all figures and layers, the system may be configured for high throughput and low latency by employing asynchronous processing, distributed data storage, and loadbalanced APIs. This enables support for enterprise-scale workloads involving tens of thousands of assets, hundreds of spatial datasets, and sub-minute alerting latency, thereby meeting the operational requirements of risk-sensitive domains such as financial services, logistics, environmental compliance, and public sector resilience planning.

In one general aspect, therefore, the present invention is directed to computer-implemented systems and method for financial risk monitoring using geospatial data. The system comprises, in various embodiments, a data ingestion pipeline comprising one or more processors configured to: ingest geospatial data from a plurality of heterogenous data sources in disparate formats; normalize the geospatial data into a common spatial reference framework; after normalizing, apply spatial indexing to the geospatial data using a hierarchical grid-based indexing scheme at multiple resolutions; after applying spatial indexing, store the geospatial data in a geospatial database. The geospatial database is implemented using a spatially indexed relational database system and is configured to store metadata describing data sources and update intervals and alert rules associated with geospatial conditions. The system also comprises a financial system, comprising one or more data stores that maintain information identifying financial instruments and portfolios, and linkage data associating the financial instruments with corresponding geospatial regions. The system also comprises an application programming interface (API) layer, implemented in software and comprising: a query processor configured to receive spatial queries and retrieve responsive geospatial data from the geospatial database; a rules engine configured to evaluate alert conditions based on incoming data updates and registered rules; and a notification subsystem configured to transmit alert notifications when one or more alert conditions are satisfied. The system also comprises a user interface subsystem comprising one or more software modules deployed on client computing devices and communicatively coupled to the rules engine and the geospatial database, the user interface subsystem being configured to receive user inputs and present alert-related outputs, thereby enabling end-user interaction with the system.

The data ingestion pipeline may be implemented as a set of software modules executing on one or more physical computing nodes that are communicatively coupled to external data sources and internal processing components over a network interface. In some implementations, the pipeline is deployed across containerized environments, virtual machines, or serverless execution layers, with orchestration provided by workflow engines such as Apache Airflow or Kubernetes-based schedulers. The pipeline includes connectors configured to interface with external data providers using secure communication protocols, such as RESTful APIs, FTP, or message queues. Upon ingesting raw geospatial data in a variety of heterogeneous formats—including but not limited to GeoJSON, Shapefiles, or raster image files—the pipeline applies format-specific parsing logic to convert incoming data into a structured intermediate representation. Spatial normalization modules then project the data into a unified coordinate reference system, such as WGS84, while temporal normalization modules standardize timestamps to a canonical format such as UTC. The processed data is subsequently indexed using a hierarchical spatial indexing algorithm, such as the H3 hexagonal indexing scheme or a quadtree-based alternative, enabling efficient multi-resolution spatial lookup. The normalized and indexed data is stored in a backend geospatial database for downstream querying and analysis.

The financial system (or financial computer system) may be implemented using one or more physical or virtual database servers configured to host relational or graph-based data stores that contain structured records identifying financial instruments, such as commercial mortgage-backed securities, corporate equities, or supply chain assets. Portfolio data, including security groupings, ownership hierarchies, and exposure metrics, may be maintained in relational tables organized by client accounts or institutional mandates. Linkage between financial instruments and geographic locations may be recorded in associative tables that store geospatial identifiers such as H3 cell indices, ZIP codes, or administrative boundary tags. These data stores may be updated periodically via scheduled data import routines from third-party systems (e.g., Bloomberg, FactSet) using Extract-Transform-Load (ETL) pipelines that validate and map incoming records into the system's internal schema. The financial system may also include access control layers, audit logging mechanisms, and high-availability replication strategies depending on the regulatory or enterprise deployment context.

The application programming interface (API) layer may be implemented in software as a set of executable services deployed on one or more backend web servers or containerized microservices. This layer exposes machine-readable endpoints, typically via HTTPS, and receives incoming client requests in structured formats such as JSON. The API layer includes a query processor, which interprets spatial or portfolio-based queries submitted by clients and translates them into internal database queries compatible with a spatially indexed relational system such as PostGIS. In addition, the API layer includes a rules engine that evaluates incoming data against alert conditions registered in the database, using a combination of stored threshold logic and dynamic rule evaluation techniques implemented in a compiled or interpreted language such as Python or Java. When one or more alert conditions are met, a notification subsystem is triggered to transmit alerts through designated channels, which may include push-based updates to user dashboards, emails, or API callbacks. The entire API layer may be deployed in a scalable configuration using a cloud-native orchestration platform and supports both synchronous and asynchronous modes of interaction.

The user interface subsystem may comprise a suite of software modules designed to support user interaction with the system and may be deployed across a range of client computing devices, including desktop workstations, laptops, tablets, or mobile devices. In one implementation, the subsystem includes a browser-based graphical interface constructed using web development frameworks such as React or Vue.js. This interface presents interactive dashboards, visualizations, and configuration menus that allow users to monitor geospatial conditions, configure alerts, and examine financial exposure. In another implementation, a programmatic software development kit (SDK) written in a high-level language such as Python enables technical users to automate queries, integrate with enterprise workflows, or conduct batch analyses. A natural language interface may also be included, wherein user input in free-form English is parsed by an NLP engine—e.g., based on a fine-tuned transformer model or a deterministic grammar-based parser—and translated into structured queries that interact with the backend systems. The user interface subsystem can be communicatively coupled to both the alert engine and the geospatial database, enabling real-time display of alerts, search results, and portfolio insights.

In various implementations, the hierarchical grid-based indexing scheme comprises an H3 grid structure at multiple resolutions or a quadtree-based indexing structure configured to enable hierarchical spatial resolution.

In various implementations, the geospatial database comprises a spatially indexed relational database system configured to perform spatial joins, range queries, and proximity-based retrieval using geospatial functions.

In various implementations, the financial system comprises a portfolio analytics module configured to compute aggregated exposure metrics for geospatially linked financial instruments. Also, the financial system could comprise a data integration module configured to import external financial datasets for market data enrichment.

In various implementations, the rules engine is configured to evaluate alert conditions comprising both geospatial thresholds and financial exposure thresholds.

In various implementations, the notification subsystem comprises a dashboard alert publisher configured to present triggered alerts within a user-facing graphical interface.

In various implementations, the user interface subsystem comprises a web-based dashboard configured to display visual map overlays and time-series exposure metrics corresponding to triggered alerts. The user interface subsystem could comprise a software development kit (SDK) configured for batch spatial query execution and automated retrieval of geospatial alert information and/or a natural language processing module configured to interpret plain-English user input and convert the input into spatial queries.

In various implementations, the data ingestion pipeline comprises a scheduling engine configured to automatically ingest updated geospatial datasets at fixed time intervals.

In various implementations, the geospatial data, after normalization and spatial indexing, are subdivided into fixed-resolution spatial cells for parallelized alert evaluation and query processing.

In various implementations, the geospatial database and financial system are deployed on a server cluster comprising multiple networked computer nodes configured to execute spatial queries, manage alert rules, and maintain transactional consistency across distributed storage systems.

While the present invention has been described in connection with exemplary embodiments, it will be understood by those skilled in the art that various changes, substitutions, and modifications may be made without departing from the scope of the invention. The systems and methods described herein may be implemented in a wide variety of computing environments and configurations, and references to particular hardware, software, or architectural components are illustrative rather than limiting. Unless otherwise stated, no particular order of operations is required, and the steps of any described methods may be rearranged, combined, or omitted in accordance with the design objectives. Furthermore, the use of singular terms (e.g., "a," "the," "one") should be understood to encompass both singular and plural instances unless clearly indicated otherwise.

Nothing in the foregoing description is intended to imply that any particular feature, element, or embodiment is essential to the invention or required for every implementation. Where features are described in relation to separate embodiments, such features may be combined in a single embodiment unless explicitly stated otherwise. The scope of the invention is defined solely by the claims and their legal equivalents, and not by any examples provided in the description.

What is claimed is:

1. A computer-implemented system for financial risk monitoring using geospatial data, comprising:
   a data ingestion pipeline comprising one or more processors configured to:
      ingest geospatial data from a plurality of heterogenous data sources in disparate formats;
      normalize the geospatial data into a common spatial reference framework; and
      after normalizing, apply spatial indexing to the geospatial data using a hierarchical grid-based indexing scheme at multiple resolutions; and
      after applying spatial indexing, store the geospatial data in a geospatial database;
   the geospatial database, implemented using a spatially indexed relational database system and configured to store:
      metadata describing data sources and update intervals; and
      alert rules associated with geospatial conditions;
   a financial system, comprising one or more data stores that maintain information identifying financial instruments and portfolios, and linkage data associating the financial instruments with corresponding geospatial regions;
   an application programming interface (API) layer, implemented in software and comprising:
      a query processor configured to receive spatial queries and retrieve responsive geospatial data from the geospatial database;
      a rules engine configured to evaluate alert conditions based on incoming data updates and registered rules; and
      a notification subsystem configured to transmit alert notifications when one or more alert conditions are satisfied; and
   a user interface subsystem comprising one or more software modules deployed on client computing devices and communicatively coupled to the rules engine and the geospatial database, the user interface subsystem being configured to receive user inputs and present alert-related outputs, thereby enabling end-user interaction with the system.

2. The system of claim 1, wherein the hierarchical grid-based indexing scheme comprises an H3 grid structure at multiple resolutions.

3. The system of claim 1, wherein the geospatial database comprises a spatially indexed relational database system configured to perform spatial joins, range queries, and proximity-based retrieval using geospatial functions.

4. The system of claim 1, wherein the financial system comprises a portfolio analytics module configured to compute aggregated exposure metrics for geospatially linked financial instruments.

5. The system of claim 1, wherein the financial system comprises a data integration module configured to import external financial datasets for market data enrichment.

6. The system of claim 1, wherein the rules engine is configured to evaluate alert conditions comprising both geospatial thresholds and financial exposure thresholds.

7. The system of claim 1, wherein the notification subsystem comprises a dashboard alert publisher configured to present triggered alerts within a user-facing graphical interface.

8. The system of claim 1, wherein the user interface subsystem comprises a web-based dashboard configured to display visual map overlays and time-series exposure metrics corresponding to triggered alerts.

9. The system of claim 1, wherein the user interface subsystem comprises a software development kit (SDK) configured for batch spatial query execution and automated retrieval of geospatial alert information.

10. The system of claim 1, wherein the user interface subsystem comprises a natural language processing module configured to interpret plain-English user input and convert the input into spatial queries.

11. The system of claim 1, wherein the data ingestion pipeline comprises a scheduling engine configured to automatically ingest updated geospatial datasets at fixed time intervals.

12. The system of claim 1, wherein the geospatial data, after normalization and spatial indexing, are subdivided into fixed-resolution spatial cells for parallelized alert evaluation and query processing.

13. The system of claim 1, wherein the hierarchical grid-based indexing scheme comprises a quadtree-based indexing structure configured to enable hierarchical spatial resolution.

14. The system of claim 1, wherein the geospatial database and financial system are deployed on a server cluster comprising multiple networked computer nodes configured to execute spatial queries, manage alert rules, and maintain transactional consistency across distributed storage systems.

15. A computer-implemented method for financial risk monitoring using geospatial data, comprising:
   by a data ingestion pipeline comprising one or more processors, ingesting geospatial data from a plurality of heterogeneous data sources in disparate formats;
   by the data ingestion pipeline, after ingesting the geospatial data, normalizing the geospatial data into a common spatial reference framework;
   by the data ingestion pipeline, after normalization, applying spatial indexing to the geospatial data using a hierarchical grid-based indexing scheme at multiple resolutions;
   by the data ingestion pipeline, after applying the spatial indexing, storing the geospatial data in a geospatial database;
   by the geospatial database, implemented using a spatially indexed relational database system, maintaining:
      metadata describing data sources and update intervals; and
      alert rules associated with geospatial conditions;
   by a financial system comprising one or more data stores, maintaining information identifying financial instruments and portfolios, and linkage data associating the financial instruments with corresponding geospatial regions;
   by an application programming interface (API) layer implemented in software, receiving a spatial query via a query processor and retrieving responsive geospatial data from the geospatial database;
   by a rules engine within the API layer, evaluating alert conditions based on incoming data updates and the alert rules;
   by a notification subsystem within the API layer, transmitting alert notifications when one or more alert conditions are satisfied; and
   by a user interface subsystem comprising one or more software modules deployed on client computing devices and communicatively coupled to the rules engine and the geospatial database, receiving user inputs and presenting alert-related outputs, thereby enabling end-user interaction with the system.

16. The method of claim 15, wherein applying spatial indexing to the geospatial data using the hierarchical grid-based indexing scheme comprises applying an H3 grid structure at multiple resolutions.

17. The method of claim 15, wherein the geospatial database comprises a spatially indexed relational database system configured to perform spatial joins, range queries, and proximity-based retrieval using geospatial functions.

18. The method of claim 15, further comprising, by a portfolio analytics module of the financial system, computing aggregated exposure metrics for geospatially linked financial instruments.

19. The method of claim 15, wherein evaluating alert conditions based on incoming data updates and the alert rules comprises evaluating conditions comprising both geospatial thresholds and financial exposure thresholds.

20. The method of claim 15, wherein receiving user inputs and presenting alert-related outputs comprises executing, by a software development kit (SDK) of the user interface subsystem, batch spatial query operations and retrieving corresponding geospatial alert information.

21. The method of claim 15, wherein receiving user inputs comprises using a natural language processing module of the user interface subsystem to interpret plain-English input and convert the input into a spatial query.

22. The method of claim 15, further comprising subdividing, by the data ingestion pipeline, the normalized and spatially indexed geospatial data into fixed-resolution spatial cells for parallelized alert evaluation and spatial query processing.

23. The method of claim 15, wherein maintaining the geospatial database and the financial system comprises executing spatial queries and managing alert rules on a server cluster comprising multiple networked computer nodes configured to maintain transactional consistency across distributed storage systems.

* * * * *